United States Patent [19]

Woerner

[11] 4,012,335

[45] * Mar. 15, 1977

[54] PROCESS FOR REMOVING INTERMITTENT ORGANIC COMPOUNDS FROM GASEOUS STREAMS

[75] Inventor: Rudolph C. Woerner, Houston, Tex.

[73] Assignee: Petro-Tex Chemical Corporation, Houston, Tex.

[ * ] Notice: The portion of the term of this patent subsequent to June 8, 1993, has been disclaimed.

[22] Filed: Oct. 28, 1975

[21] Appl. No.: 625,937

Related U.S. Application Data

[63] Continuation-in-part of Ser. No. 498,388, Aug. 19, 1974, Pat. No. 3,962,127.

[52] U.S. Cl. .................................. 252/419; 252/416
[51] Int. Cl.² ............................................. B01D 15/06
[58] Field of Search ............................. 252/419, 416

[56] References Cited

UNITED STATES PATENTS

| | | | |
|---|---|---|---|
| 2,167,655 | 8/1939 | Houdry et al. | 252/419 X |
| 2,285,401 | 6/1942 | Bates | 252/416 X |
| 2,330,710 | 9/1943 | Hemminger | 252/419 X |
| 2,981,695 | 4/1961 | Peery | 252/419 X |
| 3,219,587 | 11/1965 | Pitzer et al. | 252/419 |
| 3,235,511 | 2/1966 | Derr | 252/419 |
| 3,634,292 | 1/1972 | Hayes | 252/419 X |
| 3,649,559 | 3/1972 | Cooper | 252/419 X |

*Primary Examiner*—Patrick P. Garvin
*Assistant Examiner*—William G. Wright
*Attorney, Agent, or Firm*—N. Elton Dry; Kenneth H. Johnson

[57] ABSTRACT

Intermittent hydrocarbon contaminants, which are volatilized by an air regeneration stream from coked catalyst in cyclic dehydrogenation process, are effectively removed from the gaseous regeneration stream containing them prior to venting it by contacting that portion of the stream containing a predominant amount of the volatilized hydrocarbons with a catalyst such as chromia-alumina in the presence of air to convert a substantial amount of the hydrocarbon contaminants to water and $CO_2$.

8 Claims, 2 Drawing Figures

PROCESS FOR REMOVING INTERMITTENT ORGANIC COMPOUNDS FROM GASEOUS STREAMS

This application is a continuation-in-part of Ser. No. 498,388, filed Aug. 19, 1974. Now U.S. Pat. No. 3,962,127.

BACKGROUND OF THE INVENTION

This invention relates to the ecologically safe disposal of intermittent burnable contaminants in gaseous streams. More particularly, the present invention relates to the manner of handling the gaseous emissions from the regeneration of a fixed bed dehydrogenation catalyst.

Non-oxidative dehydrogenation of organic compounds, particularly hydrocarbons, has been in use for years. These processes are generally applied to $C_4$ to $C_8$ hydrocarbons and particularly for the preparation of less saturated hydrocarbons having four or five carbon atoms, for example, n-butenes and butadiene prepared from n-butane.

The dehydrogenations are carried out over a contact mass, usually by passing a gaseous stream containing a dehydrogenable hydrocarbon over the mass in a reactor. The contact mass is preferably a material which is catalytic for the dehydrogenation, for example a metal oxide or mixture of oxides such as chromia-alumina. These catalysts may be supported or unsupported. A consideration in selecting the catalyst form is the pressure drop through the reactor. It can be appreciated that the catalyst particles must have sufficient surface area to provide a catalytic benefit, but nonetheless not be of too fine a configuration such that there is a large pressure drop through the reactor. A general range of catalytic particle sizes which accommodates both objectives is about 1/16 to 1.

The non-oxidative dehydrogenations are preferably carried out in a cyclic manner, wherein a gaseous feed containing the dehydrogenable compound, for example butane, is passed through a catalyst bed for a period of time. During this passage, the compound is converted to a less saturated compound, e.g., butene and butadiene, and the catalyst bed becomes coked to some extent. Basically the process involves stopping the dehydrogenation feed and initiation of a regenerative gaseous feed through the catalyst bed. In the case of a hydrocarbon, such as butane, the coking of the catalyst is common and an oxidizing gas, i.e., one containing molecular oxygen such as air is used to regenerate the catalyst. The oxygen aids in burning off or other wise removing the carbonaceous material which has become deposited on the catalyst during the dehydrogenation cycle. Although these are the two basic portions of the cycle, there may be other steps such as purges, evacuations, and the like.

Generally, several reactors are operated as a unit to have some reactors dehydrogenating while other reactors are in regeneration, purge, evacuation, or the like. Thus, in this manner the process equipment for handling product, regeneration gases, etc., is utilized most effectively. The problem to which the present invention is particularly directed is in the nature of the off gases from the regeneration step.

It has long been recognized that the regenerative gases passing through the reactor are not constant in composition for the entire duration of the regeneration. The initial portion of the regenerative gases are generally quite high in burnable materials. This was noted by early workers such as J.R. Bates in U.S. Pat. No. 2,285,401. Similarly, it was noted that this initial portion of the regenerative gases was deficient in oxygen, due probably to some combustion of the material coked on the catalyst. The patentee determined that the regenerative off gases, because of their low oxygen content, would be good process gases to add to the feed stream during the dehydrogenation cycle. To improve the regenerative gases for this employment, they could be subjected to purification and controlled combustion in catalytic combustion zone. The purpose being as much to remove oxygen as the burnable materials, hence oxygen was excluded from the catalytic combustion zone. This undoubtedly resulted in very poor removal of burnables from the gaseous stream.

The problem faced by the patentee was the need for a feed diluent, one which was available in large supplies and did not contain reactive materials, detrimental to the reaction. The regenerative off gas, which was low in oxygen, met these requirements, and if the oxygen content were too high the gas could be burned further to leave it practically oxygen free.

The problem faced now is not the need for a feed stream diluent, but a means to totally destroy or convert the burnable materials in the initial portion of the regenerative gases into non-polluting materials. Various proposals have been made and each is objectionable or unworkable in practice. For example, attempts were made to send all of the regenerative off gases into an unfired waste heat boiler, wherein by dent of the conditions therein the burnables would undergo combustion; however, the combustion has been controllable and explosive conditions have occurred. Another suggestion has been to feed the gases to a fired boiler. This has proven unworkable because of the great variation in the constitution of the regenerative off gases, not only over the duration of a particular cycle wherein the gases coming out of the reactor have a high initial burnable content and decline thereafter, but also variations from cycle to cycle as to the magnitude of the initial burnables and the rate of change of the composition of the off gases. Burners characteristically are designed and built for constant state operation. Fluctuations such as those imparted by feeding in the regenerative off gases are not tolerable and at best would be the cause of frequent flameouts. Similarly, boilers are tightly designed and no performance could be depended upon with the variations the regenerative off gases could cause.

Moreover, none of the alternates tried were readily controllable to the extent necessary to essentially destroy the waste materials in the regenerative gases.

The present invention features both process and apparatus for the removal of high percentages of the burnable materials in the regenerative off gases.

DRAWINGS

SUMMARY OF THE INVENTION

The invention is a method of removing burnable carbonaceous materials, i.e., organic compounds principally hydrocarbons from a regenerative gas stream. Briefly stated, the invention is a process for treating a gaseous stream containing intermittently therein burnable carbonaceous materials comprising admixing a portion of said gaseous stream containing a predominant amount of said carbonaceous material therein with a gaseous stream containing at least about 10 volume percent oxygen, contacting said mixture with a contact mass, preferably a catalyst containing a metal, having at least two oxidation states such as for example metal oxides and metal chromites, at a temperature in the range of 800° to 1500° F and recovering a gaseous stream having substantially less of said carbonaceous material than said mixture and the apparatus used therein.

DETAIL DESCRIPTION OF THE INVENTION

The present invention has been particularly valuable in handling the initial portion of the regenerative off gases from a fixed bed dehydrogenation catalyst. The catalysts used in these dehydrogenations are usually metal compounds or mixtures of metal compounds such as metal oxides, e.g., the oxides of chromium, molybdenum, vanadium, iron, nickel, chromites such as magmesium chromite, and the like. Generally, these catalysts can be characterized as compounds containing a metal having a polyoxidation state, i.e., a metal having at least two oxidation states, in addition to the zero state. Suitable metals are found in Groups IVB, VB, VIB, VIIB, VIII, IB, IVA, VA and VIA of the Periodic Table* of elements. Paritcularly useful polyoxidation state metals are Ti, V, Cr, Mn, Fe, Co, Ni, Cu, Nb, Mo, Ru, Rh, Pd, Sn, Sb, W, Re, Os, Ir, Pt, Au, Hg, Tl, Pb, Bi, and Po. Chromia-alumina dehydrogenation catalysts have been accepted for a number of years as the most preferred catalysts for this type of reaction. The chromia-alumina catalysts are prepared by treating activated alumina with a solution of chromic acid, draining off the excess acid from the alumina drying and heat treating the resultant material at about 1400° F. Commercial chromia-alumina dehydrogenation catalysts normally contain about 20% chromium oxide. Preparative methods are shown, for example, in U.S. Pat. Nos. 2,399,678 and 2,419,997. Chromia magnesia dehydrogenation catalysts are described in detail in U.S. Pat. No. 3,781,376. These patents describe a portion of the prior art regarding dehydrogenation catalysts, and are not intended to be an exhaustive listing of the suitable catalysts or preparative methods therefor. The catalyst per se is not the subject matter of the present invention and any of the normal catalysts of this type could be utilized herein.

*Handbook of Chemistry and Physics, 45th. Ed., 1964–1965, The Chemical Rubber Co., Cleveland, Ohio, p. B-2.

Figure 1:
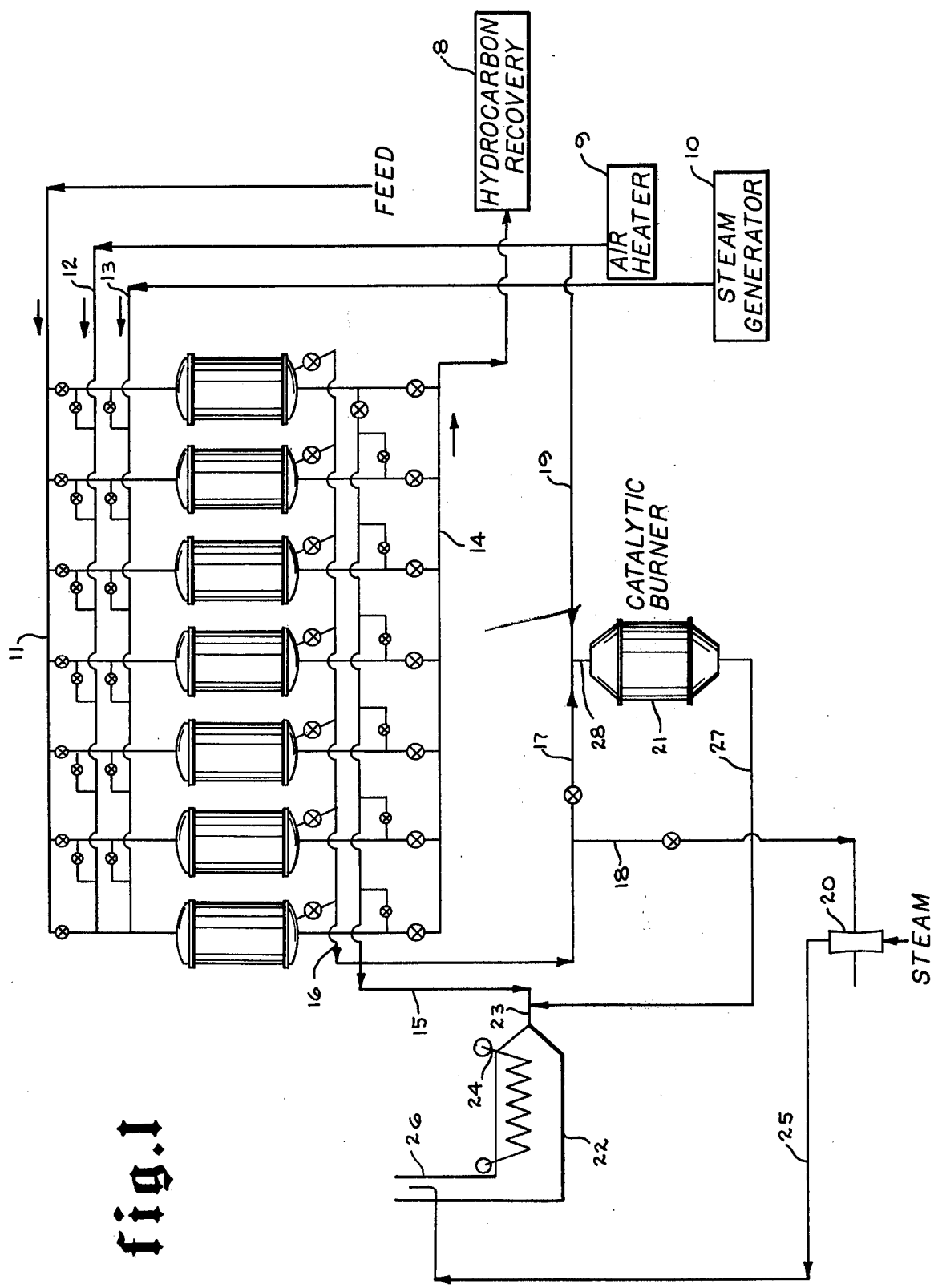
FIG. 1 is a diagramatic flow sheet of the proposed process.

The invention can best be described by going through a cycle. Referring to FIG. 1, a seven reactor (1–7) system for the dehydrogenation of normal butane is described. Each reactor operates on a 21-minute cycle. The seven reactors operate as a unit, using common recovery, antipollution equipment, etc., such that three reactors are on dehydrogenation, one on purge (purging either air or hydrocarbon) and three reactors are on regeneration. There is approximately a three-minute lag between reactors, for instance, reactor 2 is three minutes behind reactor 1, reactor 3 is three minutes behind reactor 2, etc. The result is, for example, if reactors 1, 2, and 3 are all on dehydrogenation, reactor 1 had already been on dehydrogenation 6 minutes when reactor 3 is just coming out on dehydrogenation. The exact time sequence is not the subject of the present invention, although the intermittent nature of some steams therefrom is a feature hereof as noted below.

To describe the invention, the operation of one reactor will be followed through the cycle. The feed enters reactor 1 via line 11 through the proper valved branch. The dehydrogenation continues for about 9 minutes during which time feed continues to pass in and through the reactor which is packed with a bed of contact mass catalyst. The dehydrogenated product leaves reactor 1 through valved line 14 and goes to a hydrocarbon recovery 8, which may include fractionation, solvent extraction, or the like. At the end of the dehydrogenation, the feed is terminated and the reactor is steam purged through valved line 14. The steam comes into the reactor from steam generator 10 via valved line 13. The steam purge is of short duration, i.e., about 30 seconds. The steam purge enters the hydrocarbon recovery 8 where it is condensed (not shown) and eventually leaves the system as water (not shown).

After the steam purge, an oxygen-containing gas, such as air, is passed into the reactor for the regeneration. The air may be heated in direct flame equipment, i.e., natural gas is burned in this air, and the heat released goes to raising the air temperature, thus the oxygen-containing gas may contain less oxygen than air. The regeneration gas will normally contain at least 10 volume percent oxygen. The contact mass catalyst in the reactor is coked up as a result of the dehydrogenation. The amount of oxygen is about 0.1 to 2.0 mols per cubic foot of catalyst per second, preferably about 0.4 to 0.5 mol. Since the source of the oxygen is air, in a reactor with a total volume of catalyst of about 1500 to 1700 cubic feet the air would be fed at about 100 to 500 pounds per second. The oxygen in the initial portion of the regenerative gas is substantially consumed by combustion of some of the carbonaceous materials on the catalyst, so the initial portion of the regeneration gas is quickly devoid of oxygen and acts as an almost inert gas, driving off the residual carbonaceous materials, principally hydrocarbons, from the catalyst. Generally, a suitable gas for this purpose would be air or a gas containing from about 15 to 20 mol percent oxygen.

The reactor bed prior to the initial fresh regenerative gas is at a temperature of 950° to 1150° F. The fresh regenerative gas is preferably heated to a temperature of 800° to 1500° F, or more preferably, 900° to 1500° F. More particularly, the initial spent regenerative gas can be characterized as a gaseous stream leaving the reactor and containing less than about 5 volume percent less oxygen than the regenerative gas entering said reactor and containing burnable carbonaceous material. In a particular cyclic system, this portion of the spent regenerative stream can be time related and the timed portion of the cycle will generally be an accurate measure of the composition of the spent regenerative gas, that is, with a particular and relatively constant feed, conditions of dehydrogenation, etc., an initial portion of the spent regenerative gas, determined on a time basis will contain a substantial portion of the burnable carbonaceous material removed from the catalyst.

This initial portion of the spent regenerative gases has been designated the "puff" because of content of burnable carbonaceous material. These carbonaceous materials are principally hydrocarbons, but there may be some oxygen- or nitrogen-containing compounds present in very small quantities. The materials are volatilized by the initial portion of the regenerative gases, that is, the materials may be gases, and there appears to be a degree of aerosol formation as well. The amount of these materials that are stripped during any regenerative step does vary, and any time period designated as the "puff" may be adjusted for the maximum amount of material expected to be deposited in the normal operation of the process. The initial portion of the spent regenerative gas containing the predominant amount of volatilized burnable carbonaceous materials is about 5 to 8 volume percent of the total spent regenerative gas stream.

The fresh regenerative gas, hot air in this case, is fed from heater 9 through valved line 12 into the reactor. The desired portion representing the initial spent regenerative gases (the puff) is removed from the reactor through valved line 16 and valved line 17 into the catalytic burner 21.

The burner 21 is a central feature of the present invention. The puff, from the reactor, mixes with hot air which flows continuously into the burner 21 via line 19. It should be appreciated that a catalytic contact mass, i.e., combustion catalyst, reduces the temperature requirements for operation of burner 21; however, any suitable contact mass, including inert materials, may be used such as glass, stone, ceramic, and the like. The catalyst in the burner can be any of the catalysts described above as suitable for dehydrogenation.

Hence, the catalysts used in the catalytic burner may be metal compounds or mixtures of metal compounds such as metal oxides, e.g., the oxides of chromium, molybdenum, vanadium, iron, nickel, chromites such as magnesium chromite, and the like. Generally, these catalysts can be characterized as compounds containing a metal having a polyoxidation state, i.e., a metal having at least two oxidation states, in addition to the zero state. Suitable metals are found in Groups IVB, VB, VIIB, VIII, IB, IVA, VA and VIA of the Periodic Table of elements. Particularly useful polyoxidation state metals are Ti, V, Cr, Mn, Fe, Co, Ni, Cu, Nb, Mo, Ru, Rh, Pd, Sn, Sb, W, Re, Os, Ir, Pt, Au, Hg, Tl, Pb, Bi, and Po. Chromia-alumina catalysts are preferred. The chromia-alumina catalysts are prepared by treating activated alumina with a solution of chromic acid, draining off the excess acid from the alumina drying and heat treating the resultant material at about 1400° F. Commercial chromia-alumina dehydrogenation catalysts normally contain about 20% chromium oxide. Preparative methods are shown, for example, in U.S. Pat. Nos. 2,399,678 and 2,419,997. Chromia magnesia dehydrogenation catalysts are described in detail in U.S. Pat. No. 3,781,376. These patents describe a portion of the prior art regarding dehydrogenation catalysts, and are not intended to be an exhaustive listing of the suitable catalysts or preparative methods therefor useful in the catalytic burner.

The burnable carbonaceous material in the puff is substantially completely converted to water and $CO_2$ which is fed by line 27 into line 23 hence into the waste heat boiler 22. An essential feature of the process is the continuous feeding of hot air to the catalytic burner 21. The hot air (as described above may contain less than 20 volume percent oxygen) is fed at a temperature of 800° to 1500° F. The hot air feed is important since it maintains the catalyst in the reactor at a temperature sufficient to burn or convert the carbonaceous material. The hot air also is the source of oxygen for the combustion. Direct flame heated hot air will typically contain 16 to 18 volume percent oxygen. Additional oxygen may be added to the air going to the burner, for example, to make a total oxygen volume up to about 30 percent. The temperature of the puff is generally 700° to 1100° F and would be too cool if the catalyst were not maintained at the elevated temperature. Since only an initial contaminated portion of the spent regenerative gases is being handled in the catalytic burner, the equipment needed is not massive compared to total volume of gases flowing through the reactors. Thus the greatest benefit, i.e., purer air, can be realized without high equipment costs. Generally, at least 85 weight percent of the burnable carbonaceous material will be removed from the mixture entering the catalytic burner, more usually 95 to 98 weight percent will be removed.

Figure 2:
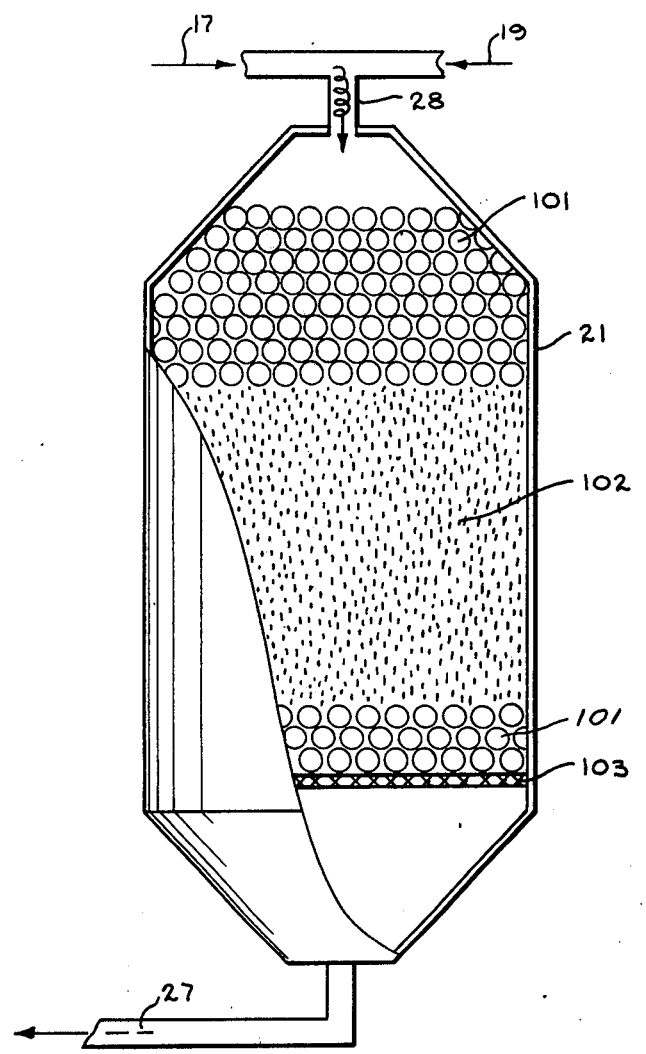
FIG. 2 is a cross sectional elevation of the catalytic burner of the present invention.

The puff as disclosed in the present invention occurs on a regular intermittent basis, thus the continuous flow of air to the catalytic burner continually prevents any coke build up from occurring on the catalyst therein and allows the hot air to maintain the burner temperature after each contact with the cooler puff. FIG. 2 depicts the catalytic burner 21. Line 17 from the reactor bank and line 19 from the air heater 9 join in a conventional mixing tee 28 a short distance above catalytic burner 21. Line 17 as noted above is a valved line and is only intermittently active, that is the puff or initial portion of the spent regenerative gases containing the principal part of the burnable material volatilized from the catalyst in the reactors, is passed into the tee 28. The hot air stream line 19, however, is continuous. The conical shape at the top of reactor 21 aids in distribution of the incoming gases and decreases the likelihood of dead spaces. It can be appreciated that there must be a sufficient residence time in the catalytic burner 21 if the volatilized materials from the reactor regeneration are to be converted to $H_2O$ and $CO_2$; however, if the velocity of the incoming mixture of burnables and air is reduced below the flame propagation velocity (about 4 to 6 ft./sec.), an explosion becomes very likely. Hence, one function of the balls 101 in the upper part of the catalytic burner 21 is to occupy a portion of the space and prevent the velocity from dropping below the flame propagation rate. A second equally important function is the heat exchange effect. Since hot air through line 19 is continuously fed to burner 21, the balls (ceramic in this case) are heated by the air to a temperature approaching that of the hot air. The puff from line 17 is generally at a lower temperature than desirable for the conversion of the entrained burnables therein and hence upon mixing with the hot air stream of line 19 it is still not desirably hot enough and still is below the temperature of the hot air stream. Thus, the balls 101, which were heated by the hot air stream 19, in the interval between puffs, to a temperature approaching the hot air, will further heat the cooler mixture of puff and hot air. The very practical benefit is that the hot air need not be maintained at a higher temperature in order to supply the desired heat enthalpy to the incoming puff.

The hot mixture of puff and air passes through the catalyst bed 102, wherein the principal portion of the hydrocarbons volatized from the catalyst in the reactors, is burned. The hot gases then pass through the ceramic balls 101 below the catalyst bed, supported on grating 103, and hence through line 27 as described elsewhere herein.

After the transmission of the initial spent regenerative gases to the catalytic burner 21, the remaining spent regenerative gases pass through the reactor and out valve line 15 and line 23 into waste heat boiler 22 wherein some recovery of energy is obtained by heat exchanger 24. At the completion of the regeneration there is an evacuation through valved line 16 and line 18 under vacuum by steam jet 20 hence through line 25 into stack 26. It should be appreciated that materials passing into stack 26 are not necessarily vented to the atmosphere per se, but may be subjected to further treatment for removal of contaminants. At this point, the reactor is ready to repeat the cycle as described above starting with the dehydrogenation.

A very significant advantage of the present invention is the manner in which it evens out the heat surges from the combustion of the burnable material in the puff.

In operation it has been found that the temperature of the gases passing out of the catalyst burner 21 is very nearly constant, thus this energy may be recovered in the waste heat boiler 22 without upsetting the operation of that boiler as has been the case with attempts to burn the puff in the waste heat boiler directly. The catalyst bed in the burner acts as a heat sink with the continuous flow of air serving to carry off excess heat from the burning over the interval between puffs, while, as noted above, maintaining the temperature of the catalyst in the burner very near the temperature of the continuous air stream (the term "air" as described above includes air having a reduced oxygen content from direct flame heating).

EXAMPLES 1 and 2

These examples demonstrate the operation of two embodiments of catalytic burner. The burner is a 10-inch diameter pipe 36 inches long, packed with 18 inches of catalytic material. The reactor has substantially the configuration of that shown in FIG. 2. Above and below the catalytic material are 9-inch beds in inert, balls of ½-inch diameter. The burner is equipped with thermowells and sample connection. The mixed stream of air and puff come into the top of the burner and the burned materials leave through the bottom.

The continuous air flow is at a temperature of 900°–1430° F. The air and puff are mixed in a conventional mixing tee 28 just up stream of the burner. The flow rate of continuous air varied and is given for each run. The puff flow rate was designed to be 0.0264 lb./sec.

Sampling of mixed stream of air and puff was made prior to entry into the burner and sampling of the effluent coming off the burner was made. The results are reported as wt.% removal of lights and heavies referring to the hydrocarbons in the puff and ppm of total hydrocarbon in the effluent. the sampling was carried out by with drawing a gaseous sample through a tube containing TENAX-GC[1]. The light hydrocarbons[2] pass through the tube and are determined in a gas phase chromatography column. The heavy hydrocarbons[3] are held in the TENAX-GC and are measured by heating the tube and feeding a helium carrier therethrough to elute the heavy hydrocarbons, which are determined by GC.

[1]TENAX-GC - a porous polymer column packing material based on 2,6-diphenyl-p-pheylene oxide. Available from Applied Science Laboratories, Inc. [2]light hydrocarbons - generally $C_1$ to $C_5$ but up to $C_7$ observed. [3]heavy hydrocarbons - all others than reported as light.

The variable conditions and results are set out below in TABLES I and II. The only difference in Examples 1 and 2 are catalytic contact surfaces. In Example 1 (TABLE I), the catalyst was Harshaw Cr 0211[5]/32 diameter pellets and in Example 2 (TABLE II) the catalyst was ½ iron balls (the same reactor was used but arranged with 6 inches of iron balls above 24 inches of ceramic balls). The puff temperature was about 800° F.

[4]a chromia-alumina - The Harshaw Chemical Company

TABLE I

| Air Temp. 60° F) | Air Rate lbs/sec | Puff Rate % of Design | (EXAMPLE 1) $O_2$ During Puff (%)* | Res. Time* (seconds) | Removal of Hcbns | | Hcbn in Effluent (ppm) |
|---|---|---|---|---|---|---|---|
| | | | | | Lights (%) | Heavies (%) | |
| 1050 | 0.027 | 104 | 10.3 | 0.20 | 95 | 95 | 120 |
| 1074 | 0.029 | 101 | 10.7 | 0.20 | 98 | 99 | 60 |
| 1075 | 0.027 | 89 | 11.0 | 0.22 | 99 | 99 | 20 |
| 1085 | 0.022 | 99 | 9.7 | 0.23 | 98 | 99 | 40 |
| 1090 | 0.018 | 95 | 8.9 | 0.28 | 98 | 94 | 80 |

*Determined on air + puff

TABLE II

| Air Temp. (° F) | Air Rate lbs/sec | Puff Rate % of Design | (EXAMPLE 2) $O_2$ During Puff (%)* | Res. Time (seconds) | Removal of Hcbns | | Hcbn in Effluent (ppm) |
|---|---|---|---|---|---|---|---|
| | | | | | Lights (%) | Heavies (%) | |
| 1120 | 0.0306 | 125 | 10.1 | 0.26 | 0 | 0 | |
| 1180 | 0.0288 | 137 | 9.4 | 0.26 | 0 | 40 | |
| 1325 | 0.0267 | 56 | 12.7 | 0.39 | 0 | — | |
| 1362 | 0.0336 | 89 | 11.9 | 0.28 | 65 | 97 | 530 |
| 1380 | 0.0318 | 76 | 12.3 | 0.31 | 89 | 99 | 180 |
| 1410 | 0.0270 | 64 | 12.6 | 0.36 | 90 | 80 | 140 |
| 1417 | 0.0270 | 91 | 10.9 | 0.32 | 96 | 99 | 50 |
| 1430 | 0.0255 | 96 | 10.4 | 0.32 | 97 | 94 | 40 |

*Determined on air + puff.

The invention claimed is:
1. A process for regenerating a contact mass catalyst having coked thereon burnable carbonaceous material comprising:
 a. contacting said coked catalyst with a first gaseous stream containing from about 15 to 20 percent by volume of oxygen, said gaseous stream being at a temperature in the range of 800° to 1500° F, b. said first gaseous stream volatilizing a portion of said carbonaceous materials from said catalyst, c. admixing a portion of said gaseous stream from step (b), said portion comprising the initial 5 to 8 volume percent of said gaseous stream from step (b), said initial portion comprising principally hydrocarbons, with a second gaseous stream containing at least about 10 volume percent oxygen, d. converting said carbonaceous materials in said gaseous mixture of step (c) in a catalytic burner into $CO_2$ and water at a temperature in the range of 800° to 1500° F, and e. recovering a gaseous stream from step (d) having substantially less of said carbonaceous materials than said mixture.

2. The process according to claim 1 wherein said first gaseous stream is air.

3. The process according to claim 2 temperature of said first and second gaseous stream is in the range of 900° to 1500° F.

4. The process according to claim 3 wherein the portion of said gaseous stream containing volatilized carbonaceous materials contains less than about 5 volume percent oxygen.

5. The process according to claim 4 wherein said catalytic burner contains a metal oxide catalyst.

6. The process according to claim 4 wherein said catalytic burner contains a metal chromite catalyst.

7. The process according to claim 5 wherein said catalyst comprises chromia.

8. The process according to claim 1 wherein catalytic burner contains an iron metal catalyst.

* * * * *